(12) United States Patent
VelurEunni

(10) Patent No.: US 7,840,765 B2
(45) Date of Patent: Nov. 23, 2010

(54) RDMA COPY-ON-WRITE

(75) Inventor: Ramesh VelurEunni, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 11/591,057

(22) Filed: Oct. 31, 2006

(65) Prior Publication Data
US 2008/0104337 A1 May 1, 2008

(51) Int. Cl.
*G06F 12/16* (2006.01)

(52) U.S. Cl. .................. 711/156; 711/161; 711/162; 714/5; 714/6

(58) Field of Classification Search ............. 711/156, 711/162, 163, 161; 714/6, 5
See application file for complete search history.

(56) References Cited

U.S. PATENT DOCUMENTS 6,487,645 B1 * 11/2002 Clark et al. ................. 711/162
2005/0004925 A1 * 1/2005 Stahl et al. ................. 707/100

* cited by examiner

*Primary Examiner*—Hong Kim
*Assistant Examiner*—Jae U Yu

(57) ABSTRACT

In an embodiment of the invention, an apparatus and method for Remote Direct Access Memory (RDMA) copy-on-write perform the steps including: marking a page of a first application as copy-on-write when the first application and a second application share the page, and exposing the page via RDMA protocol to a remote application; in response to a write access message to the page from the remote application, dropping the write access message; and stalling the first application while a copy-on-write processing is pending, in response to the write access message to the page from the remote application.

36 Claims, 6 Drawing Sheets

RDMA COPY-ON-WRITE

TECHNICAL FIELD

Embodiments of the invention relate generally to RDMA (Remote Direct Memory Access) and copy-on-write.

BACKGROUND

Many commercially available Operating Systems use copy-on-write as a method to achieve optimization in operations. Copy-on-write is used in a fork operation, where the OS (Operating System) creates a replica of a process (i.e., a running instance of an application). The original process requesting the fork operation is the parent process and the newly created process is the child process. The child process expects to have a copy of the contents of parent's address space at the time of fork. Copy-on-write is an optimization that causes physical memory pages of the parent process to be shared with the child process for memory read operations. These shared pages are marked by the OS as copy-on-write. A page that is marked copy-on-write will remain as a shared page to the parent process and child process even if both processes perform read operation on the shared page.

However, when either the parent process or the child process writes to a shared page that is marked copy-on-write, a page fault exception occurs, where the process that is performing the write operation is given a copy of the page to be written. Writing to the copy prevents the process from writing on the shared page and therefore avoids corruption of memory data for the other process that shares the page. After a process writes to that copied page, that page will remain visible to that process but will not be visible to other processes until there is another instance of an event such as fork that will mark the new page copy-on-write once again. The use of copy-on-write permits a very efficient fork operation because copying all pages of the parent process onto the address space of the child process is avoided by use of the shared pages.

Copy-on-write is also used for data segments of a shared library, where multiple processes attached to the shared library get read-only access on the data segments. When a process writes to the data portion of the shared library, a copy-on-write exception is taken in order to give a private copy of the data for the process, and the process then performs the write access to the private copy.

When a process possessing pages that are marked copy-on-write attempts to write to one of those pages, an exception (page fault exception or copy-on-write exception) that occurs tells the OS to first stall the process so that the write access of the process is delayed. The OS allocates a new dedicated page for the process, and copies data from the shared page to the new dedicated page. The OS will subsequently detach the process from the shared page, update the virtual memory to physical memory translation with the new dedicated page allocated, and then release the process so that the process performs the write access to the new dedicated page.

When a portion of a memory that is marked copy-on-write is also registered with an RDMA (Remote Direct Memory Access) device, then that memory will also be exposed to remote applications on a different computer via the RDMA protocol. As known to those skilled in the art, the RDMA protocol provides a useful method for reducing system processor work in the transmission and reception of data across a network and in other network-related processing. Prior methods do not stall the write attempts from the remote applications to a shared page of local applications, before the OS can allocate a new dedicated page for the write attempts such as an RDMA-write or RDMA-send from a remote application. Therefore, there is a risk that a remote application will corrupt the data in the memory (marked copy-on-write) of local applications (in the local node) because of the write attempts that occur to a shared page. Furthermore, while it is acceptable for the local application that exposed the memory for RDMA to see the modifications by the remote applications, the other local applications sharing the page would not be aware of the access by remote applications via RDMA, and they would see this as corruption of their data.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
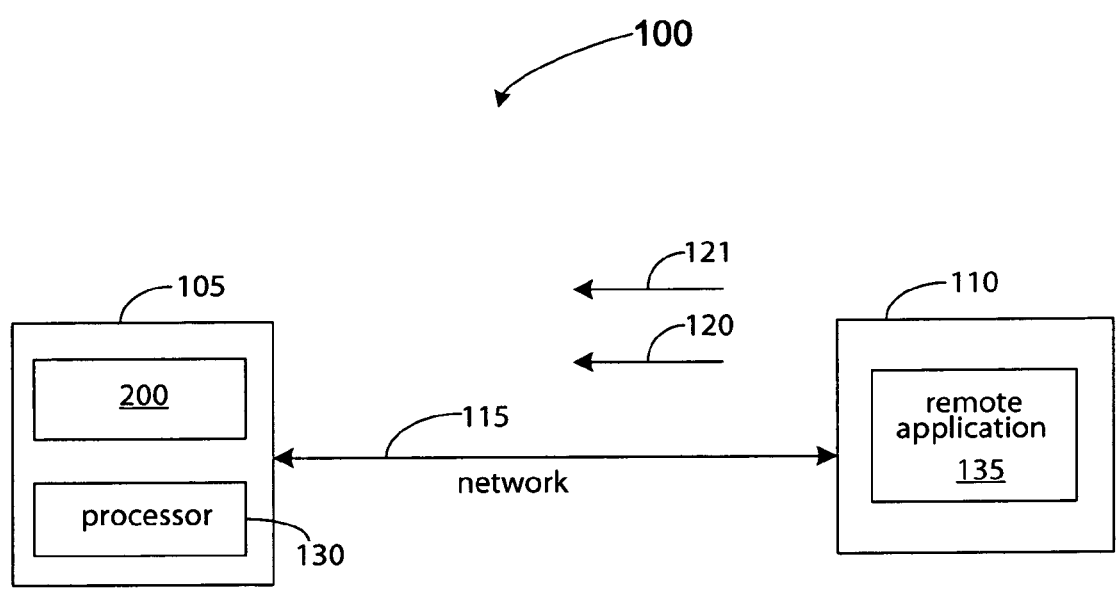
FIG. 1 is a block diagram of an example network that includes an embodiment of the invention.

FIG. 1 is a block diagram of an example network 100 that includes an embodiment of the invention. The network 100 includes a first node 105 that is connected to a second node 110 via a network 115. The first node 105 will include pages of memory that are marked copy-on-write and are also accessible by one or more remote applications 135 in the node 110 by use of the RDMA protocol, as discussed further below. The first node 105 can be a local node and the second node 110 can be a remote node on the network 115. The node 105 includes a processor 130 that executes software and includes other elements such as, for example, memory devices, interfaces, and software/firmware. The node 105 also includes known suitable computing elements that are not shown in FIG. 1 for purposes of clarity in the drawings.

As discussed in various details below, in accordance with an embodiment of the invention, the first node 105 includes an apparatus (system) 200 that can stall the write attempts 120 via the RDMA protocol from the second node 110 to the pages that are marked copy-on-write in the first node 105. The write attempts 120 can be performed by an RDMA WRITE operation or an RDMA SEND operation. As known to those skilled in the art, an RDMA WRITE operation is when the second node 110 sends the write data targeting a specific memory region on the first node 105, and an RDMA SEND operation is when the second node 110 sends the write data to the first node 105 which determines where to place this data by use of an RDMA RECV operation. The read attempts 121 can be performed by an RDMA READ operation or an RDMA RECV operation. An RDMA READ operation is when the second node 110 attempts to read data from a specific memory region on the first node 105, and an RDMA RECV operation is when the first node 105 does an RDMA SEND operation which reads data from the first node 105 and sends to the second node 110.

Figure 2:
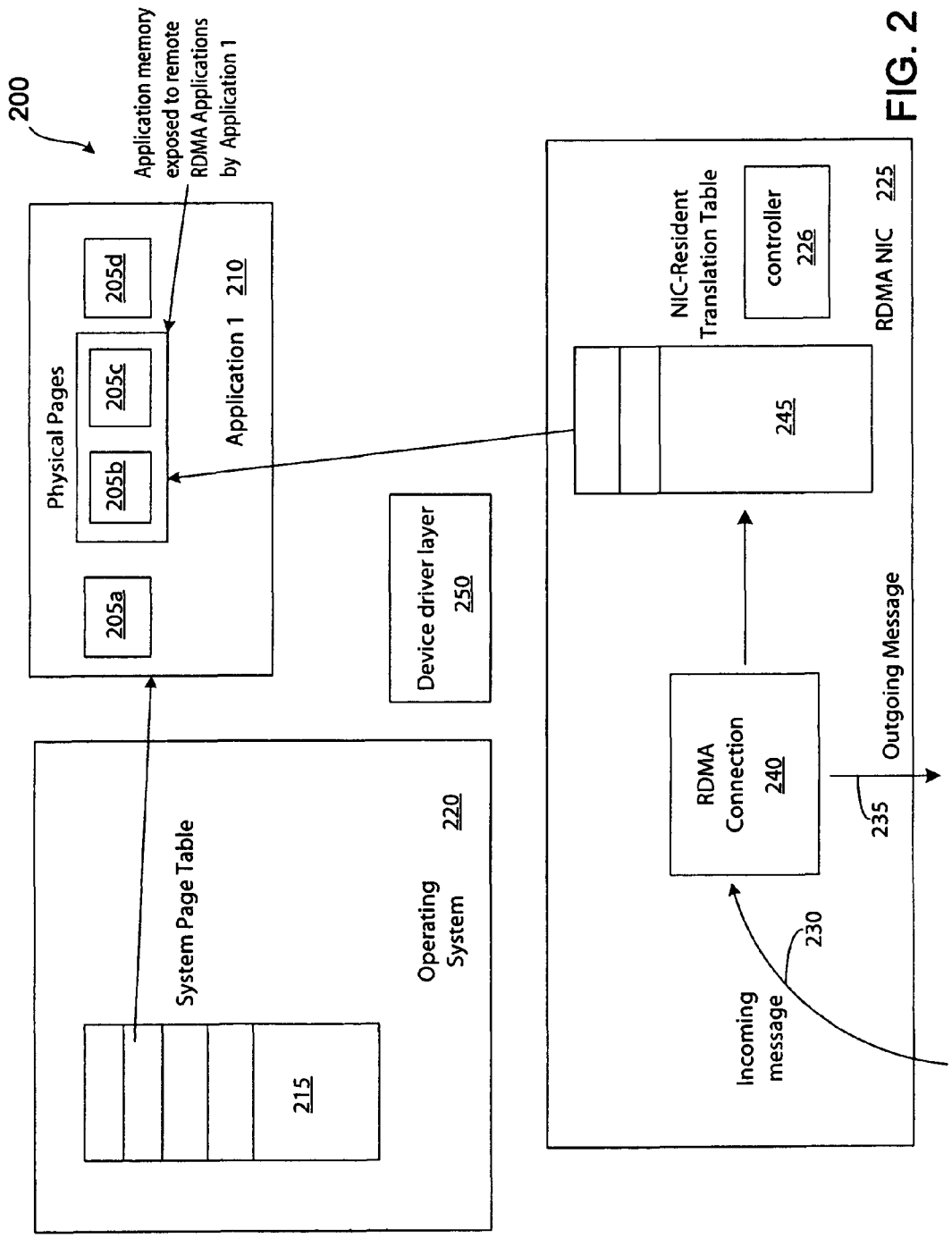
FIG. 2 is a block diagram of an apparatus (system) in accordance with an embodiment of the invention, where an application owns the memory pages that are not set to copy-on-write.

FIG. 2 is a block diagram of an apparatus (system) 200 in accordance with an embodiment of the invention, where an application 210 owns the memory pages 205*a*-205*d* that are not set to copy-on-write. The apparatus 200 can be, for example, in a node 105 (FIG. 1) of network 100. Since the application 210 is the sole owner of the pages, none of the pages 205*a*-205*d* will be set to copy-on-write. As discussed below, an OS 220 will need to mark entries in a system page table 215 in order to mark a page as copy-on-write.

The apparatus 200 also includes an RDMA NIC (RDMA Network Interface Card) 225 (or other suitable interfaces or structures) that receives incoming messages 230 from a remote node (e.g., node 110 in FIG. 1), and sends outgoing messages 235 to a remote node. The RDMA NIC can be another suitable type of RDMA interface such as, for example, an adapter or board. The messages 230 and 235 are transmitted by use of the RDMA protocol. The messages in the NIC 225 are received for an RDMA connection 240 created by application 210 with a remote node. RDMA NICs on both local nodes and remote nodes are typically required to implement the RDMA protocol.

The NIC 225 includes a controller 226 which permits the NIC 225 to perform various steps discussed below with reference to FIGS. 2 through 6. The NIC 225 also includes a translation table 245 which is resident on the NIC 225 and which is similar to the system page table 215 in the OS 220. The translation table 245 contains the memory addresses of the physical pages (in the application memory) that are exposed by the application 210 to RDMA applications in remote nodes. In the example of FIG. 2, the translation table 245 is programmed with the addresses of the pages 205*b* and 205*c* which are exposed by the application 210 to remote nodes. Therefore, RDMA access operations can be performed on the pages 205*b* and 205*c* by applications on remote nodes. Note also that in the example of FIG. 2, the pages 205*a* and 205*d* (in the application memory) are not exposed via RDMA by the application 210 to remote nodes.

The apparatus 200 also includes a device driver layer 250 which permits the OS 220 and RDMA NIC 225 to communicate with each other, as described in additional details below. The device driver layer 250 knows attributes of the translation table 245 such as, for example, the location of the translation table 245, the format of the entries in the translation table 245, and other attributes.

Figure 3:
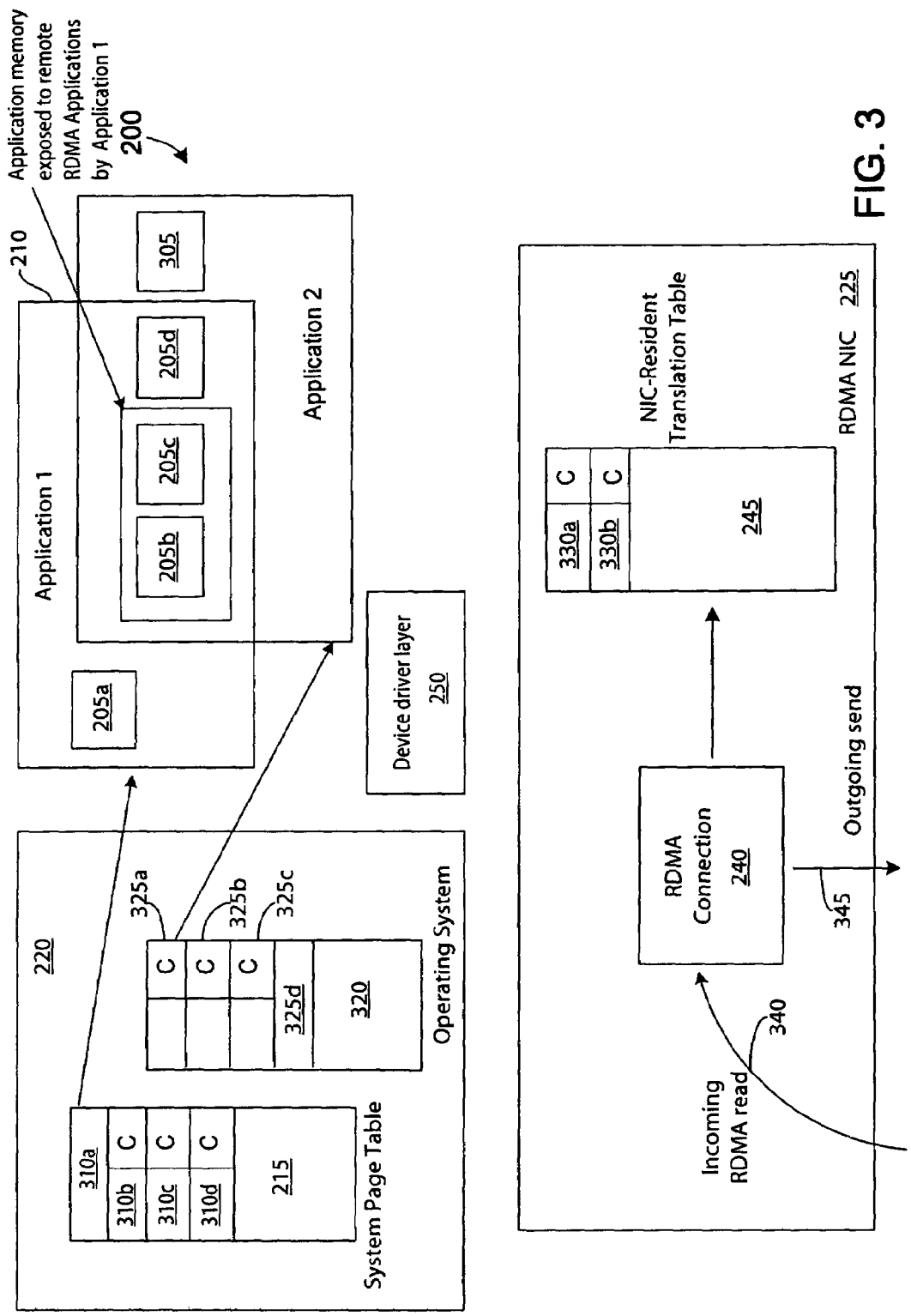
FIG. 3 is a block diagram of an apparatus (system) in accordance with an embodiment of the invention, where an application owns the memory pages that are set to copy-on-write.

FIG. 3 is a block diagram of the apparatus (system) 200 in accordance with an embodiment of the invention, where certain memory pages are jointly owned by the application 210 and by the application 300. The pages 205*b*, 205*c*, and 205*d* are shared by both applications 210 and 310 and, therefore, are set to copy-on-write. The procedures for marking the pages to copy-on-write are previously described above. The system page table 215 points to the pages 205*a*-205*d* owned by application 210, and the system page table 320 points to the pages 205*b*-205*d* and 305 owned by the application 300. The application 210 is the sole owner of the physical page 205*a* and the application 300 is the sole owner of the physical page 305 in this example of FIG. 3.

The system page table 215 has entries 310*a* to 310*d* that correspond to pages 205*a* to 205*d*, respectively, for the application 210. The OS 220 typically sets a bit or a flag in each of the entries 310*b* to 310*d* to indicate that their corresponding pages 205*b* to 205*d*, respectively, are marked to copy-on-write by the OS 220. This set bit is denoted as reference "C" in FIG. 3.

Similarly, the system page table 320 has entries 325*a* to 325*d* that correspond to pages 205*b*, 205*c*, 205*d*, and 305, respectively, for the application 300. The OS 220 typically sets a bit in each of the entries 325*b*, 325*c*, and 325*d* to indicate that their corresponding pages 205*b*, 205*c*, and 205*d*, respectively, are marked to copy-on-write by the OS 220.

In the translation table 245 in the RDMA NIC 225, a bit is set in each of the entries 330*a* and 330*b* to indicate that their corresponding pages 205*b* and 205*c*, respectively, are marked to copy-on-write. The entries 330*a* and 330*b* also points to the pages 205*b* and 205*c*, respectively, as pages that are exposed, via the RDMA protocol, to applications in remote nodes. When the OS 220 marks the entries in the system page tables 215 and 320 to copy-on-write, the OS 220 signals the device driver layer 250 to also mark corresponding entries to copy-on-write in the translation table 245. Therefore, in the example of FIG. 3, among the pages 205*b*-205*c* that are marked to copy-on-write, only the pages 205*b*-205*c* are exposed for access via the RDMA protocol by applications in remote nodes. Additional entries may exist in the translation table 245 without the copy-on-write setting if some dedicated page such as 205*a* is exposed to RDMA applications.

An incoming RDMA READ operation 340 from a remote node will cause data to be read from one of the pages 205*b* or 205*c* that are exposed via the RDMA protocol to a remote application 135 (FIG. 1). The outgoing RDMA SEND operation 345 sends the read data to the remote application. Since a read to any of the pages 205*b* and 205*c* will not change the stored data in those pages, new dedicated pages will not have to be created by the OS 220 from the page 205*b* or 205*c* in response to the RDMA READ 340 or outgoing RDMA SEND 345.

Figure 4:
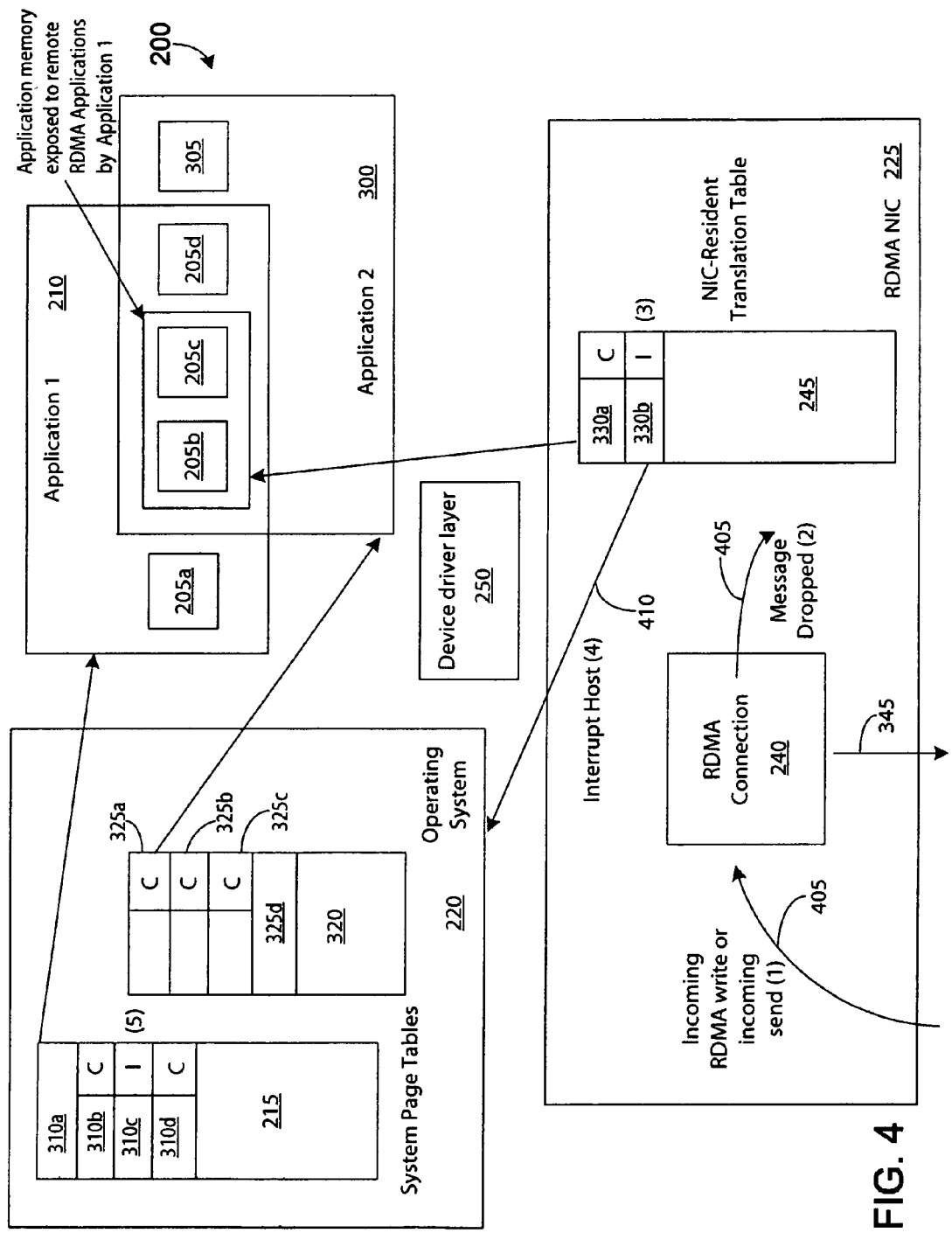
FIG. 4 is a block diagram of an apparatus (system) in accordance with an embodiment of the invention, where an application owns the memory pages that are set to copy-on-write and the apparatus receives an incoming RDMA WRITE or RDMA RECEIVE operation.

FIG. 4 is a block diagram of the apparatus (system) 200 in accordance with an embodiment of the invention, where an application owns the physical pages that are set to copy-on-write, and the apparatus 200 receives an incoming RDMA WRITE message or performs an RDMA RECEIVE operation 405 in response to an incoming RDMA SEND. The RDMA WRITE or RDMA RECEIVE operation 405 occurs in step (1) and the RDMA NIC 225 attempts to write data to the page 205*c*. In step (2), the RDMA connection 240 determines from the incoming RDMA WRITE or the incoming RDMA SEND message (an incoming RDMA send message is required to satisfy an RDMA RECV operation) 405 from the node 110 that that the target page (page 205*c* in this example) for the message is marked copy-on-write, and, as a result, the RDMA connection 240 drops the message 405 so that the RDMA WRITE OR RDMA RECEIVE operation is not performed. If an RDMA WRITE or RDMA SEND message 405 is dropped, the application 135 in the remote node can subsequently re-transmit the RDMA WRITE or RDMA SEND message 405 to the NIC 225 in accordance with the RDMA protocol. When the RDMA connection 240 drops the message 405, the remote application 135 or a remote RDMA NIC in the remote node 110 perceives this message drop as a likely packet drop in the network switching fabric of the network 115 and not as a behavior of a non-standards-compliant RDMA NIC.

In step (3), the RDMA NIC 225 will also set the entry 330b to an invalid value ("I"). The entry 330b corresponds to the page 205c which is the target page of the write data for the RDMA WRITE or RDMA RECEIVE message 405. Note that step (2) and step (3) may occur in any order.

In step (4), the RDMA NIC 225 also sends a signal 410 to the device driver layer 250 about this event providing additional information such as, for example, the RDMA Connection ID, translation table 245 information and the affected page (i.e., identification of the target page 205c). The signaling can be done via an existing interrupt mechanism between the RDMA NIC 225 and the device driver 250. The device driver 250, in turn, notifies the OS 220 to begin the copy-on-write processing, where the OS 220 will create a copy of the target page 205c. The device driver 250 notification to the OS 220 identifies the process (application) that owns the RDMA connection that received the RDMA WRITE or RDMA RECEIVE message 405. Therefore, in step (5), the OS 220 can set an invalid value "I" in the proper entry of a system page table that corresponds to the identified process (application).

Note that the RDMA connection 240 will not acknowledge the message 405 which has been dropped. It can, however, send a non-acknowledgment message to the remote node as permitted by the RDMA protocols such as InfiniBand™. If the RDMA protocol permits, the RDMA connection block 240 can process subsequent RDMA WRITE or RDMA RECEIVE messages as long as the OS 220, the device driver 250 or the application 210 is not notified of the receipt of the messages until after all previously stalled write operations (from a previous RDMA WRITE or RDMA receive message) are completed on the RDMA connection. Also, other RDMA connections in the RDMA NIC 225 are not impacted by steps performed in FIG. 4 in the context of the RDMA connection 240.

In step (5), the OS 220 will also set the entry 310c (which corresponds to the target page 205c) to the invalid value I, in response to the interrupt host signal 410.

After the entry 310c is set to the invalid value I, the OS 220 will begin the copy-on-write processing. In the meantime, if application process 210 which owns the corresponding page 205c attempts to access the page 205c, the OS 220 will stall the process until the OS 220 is done with the copy-on-write processing. The application process 210 will stall so that the write access of the process is delayed. As part of the regular copy-on-write handling, the OS 220 creates a copy of the page 205c, and this copy is shown as page 505 in FIG. 5. This new page 505 will be dedicated to the process of application 210 and is no longer shared unless the application 210 performs an operation that is deemed by the OS 220 as eligible for copy-on-write optimization.

The OS 220 will then copy data from the page 205c to the new page 505. The OS 220 then detaches the process of application 210 from the page 205c and updates virtual address to physical address mapping with the new page 505 allocated by the OS 220. This updated translation is shown in FIG. 5 which indicates that the system page tables 215 and 320 will have entries that point to pages that have changed in ownership.

The OS 220 and device driver layer 250 also then permits access to the new page 505 and page 205c. If the process of the application 210 which previously owned the page 205c is stalled, the OS 220 will also release that process so that the process now accesses the new page 505. A remote RDMA NIC in the remote node 110 will subsequently be able to write to the copy 505 of the original page, and the remote RDMA NIC is not required to change the target virtual address in order to be able to write data to the new page 505. This transparency is achieved because the RDMA NIC 223 has an updated translation table 225 with the new address for the second page, as discussed below and as shown in FIG. 5.

Figure 5:
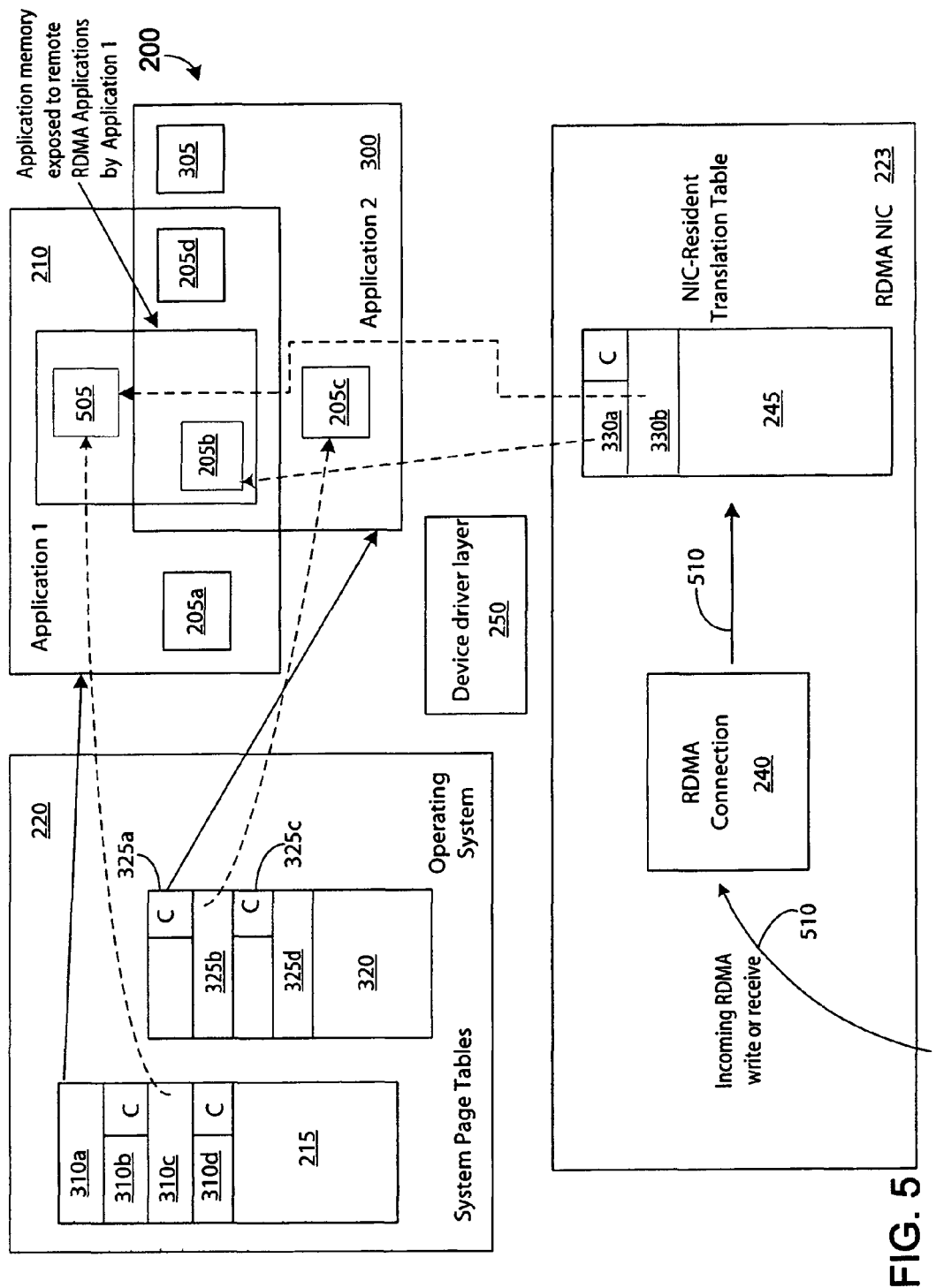
FIG. 5 is a block diagram of an apparatus (system) in accordance with an embodiment of the invention, where the copy-on-write processing has been completed.

FIG. 5 is a block diagram of the apparatus (system) 200 in accordance with an embodiment of the invention, where the copy-on-write processing has been completed. The OS 220 has created the page 505 which is a copy of the page 205c. The OS 220 also has cleared the invalid bit I from the entry 310c, and the entry 310c will now point to the new page 505. Since the invalid bit I has been removed from the entry 310c, the corresponding entry 330b in the translation table 245 also needs to have its invalid bit I cleared. The OS 220 accomplishes that by notifying the device driver 250 that the page 205c has been repaired by providing a new address of the new physical page 505. The device driver 250, in turn, re-programs the entry 330b with the new address for page 505 and clears the invalid bit I in the entry 330b. An incoming RDMA WRITE or RDMA SEND message 510 is now permitted to write data to the new page 505. The new page 505 is not shared by both applications 210 and 300. Instead, application 210 owns the new page 505.

The entry 325b points to the page 205c to indicate that the second application 300 owns the page 205c and the page 205c is no longer shared by both applications 210 and 300. Also, the OS 220 clears the copy-on-write value "C" from the entry 325b to indicate that copy-on-write is no longer set for the page 205c. Additionally, the entry 330b in the translation table 245 no longer points to the page 205c and the page 205c is no longer exposed or accessible to applications in remote nodes via the RDMA protocol.

In another embodiment of the invention, if the pages 205a-205d and 305 are memory areas in a shared library that are used by more than the two applications 210 and 300, the application 210 will get a new page 505 as shown in the example in FIG. 5, but the application 300 and other applications attached to the shared library will continue to share the page 205c for read-only access and the corresponding system page entries such as 325b will retain the copy-on-write setting.

Note also that write access to the copy is performed by a remote RDMA interface without requiring the remote RDMA interface to change the address targeted by the write access.

Since the operation of the system 200 is performed locally within a node 105 (FIG. 1), no wire protocol changes are required to standard RDMA protocol, and the system 200 is completely interoperable with RDMA-standards compliant devices from any vendor. The only requirement on the OS would be to perform and complete copy-on-write processing before retransmission timeouts expire on the RDMA connection. Furthermore, the system 200 preserves the POSIX (Portable OS Interface for UNIX) fork semantics and shared memory semantics, and does not negatively impact methods that rely on copy-on-write to achieve optimization.

Figure 6:
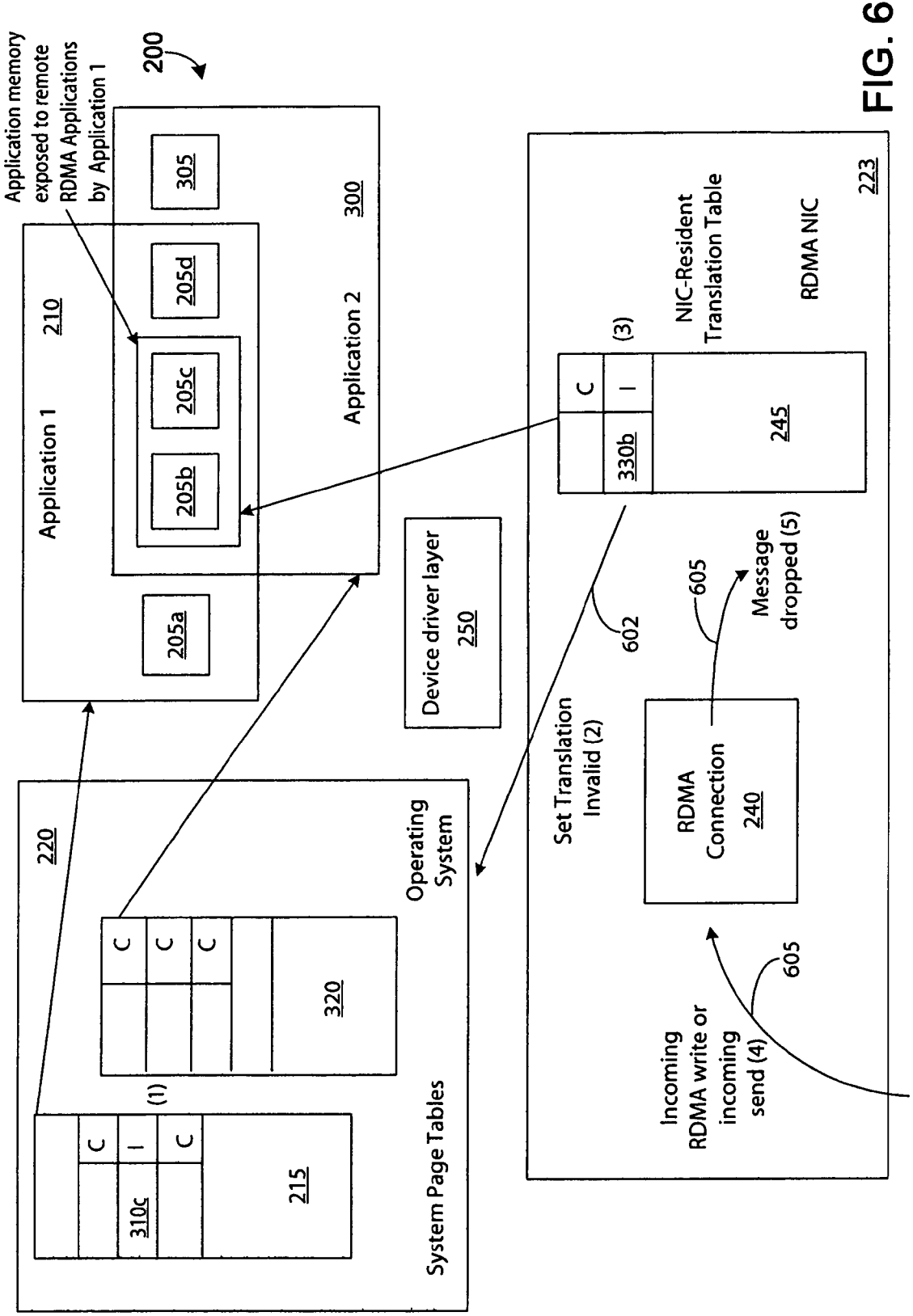
FIG. 6 is a block diagram of an apparatus (system) in accordance with an embodiment of the invention, where the application attempts a write to a page before an RDMA WRITE or RDMA SEND message is received by the RDMA interface that targets the page.

FIG. 6 is a block diagram of the apparatus (system) 200 in accordance with an embodiment of the invention, where the application 210 attempts a write to a page 205c before an RDMA WRITE or RDMA SEND message 605 is received by the NIC 223. In step (1), when the application 210 attempts to write on the page 205c, the OS 220 sets the value in entry 310c in system page table 215 to an invalid value I and begins the regular copy-on-write processing leading to creating of a new page 505 (see FIG. 5), which is a replica of the page 205c. In step (2) the OS 220 also signals the device driver layer 250 to also set the entry 330b in the translation table 245 to an invalid value I. The device driver sends a special command 602 to the RDMA NIC 225 to set the entry 330b to the invalid value I.

The operating system sets the invalid value when the first application attempts a write access to the page before the write access message is received from the remote application so that the arrival of the first write access message from the remote application does begin duplicate copy-on-write processing.

Since the entry 330b is set to the invalid value I, an incoming RDMA WRITE or an incoming RDMA SEND message 605 in step (4) is dropped in step (5).

The remaining sequence of events is similar to what was discussed in the previous FIG. 5. When the new page 505 is created, the write operation of the application 210 which has been previously stalled is now performed on the new page 505. Since the invalid bit I is removed from the entry 310c, the corresponding entry 330b in the translation table 245 will also need to have its invalid bit I cleared. The OS 220 accomplishes that by notifying the device driver 250 that the page has been repaired by providing the new address of the new physical page 505. The device driver 250, in turn, re-programs the entry 330b with the new address and clears the invalid bit I. An incoming RDMA WRITE or RDMA RECEIVE message 510 is now permitted to write data to the new page 505.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for Remote Direct Access Memory (RDMA) copy-on-write, the method comprising:

marking a page of a first application as copy-on-write when the first application and a second application in a first computing node share the page, and exposing the page via RDMA protocol to a remote application in a second computing node;

in response to a write access message to the page from the remote application received over a network between the first and second computing nodes, dropping the write access message to cause the remote application or a remote network interface at the second computing node to perceive the dropped write access message as a packet drop in the network; and stalling the first application while a copy-on-write processing is pending, in response to the write access message to the page from the remote application.

2. The method of claim 1, further comprising:
receiving a subsequent write access message to the page from the remote network interface; and
in response to the subsequent write access message, permitting a write access to a copy of the page, wherein the copy is created during the copy-on-write processing.

3. The method of claim 2, wherein the write access to the copy is performed by the remote network interface of the second computing node without requiring the remote network interface to change the address targeted by the subsequent write access message.

4. The method of claim 2, further comprising:
removing the first application from a stalled state after the copy is created.

5. The method of claim 1, further comprising:
sending an interrupt to an operating system after dropping the write access message.

6. The method of claim 1, further comprising:
setting an invalid value in a translation table of an RDMA interface of the first computing node when the write access message is dropped for causing future messages attempting to read from or write to the page to be similarly dropped.

7. The method of claim 6, further comprising:
clearing the invalid value after a copy of the page is created by the copy-on-write processing.

8. The method of claim 1, further comprising:
setting an invalid value in a system page table pointing to the first application when copy-on-write is begun in response to a write attempt from an RDMA interface so that a read or write attempt by the first application on the page is stalled.

9. The method of claim 8, wherein the invalid value is set after the write access message is received from the remote application.

10. The method of claim 8, wherein the invalid value is set when the first application attempts a write access to the page before the write access message is received from the remote application.

11. The method of claim 8, further comprising:
clearing the invalid value in the system page table after a copy of the page is created by the copy-on-write processing, so that the first application is able to access the copy.

12. The method of claim 1, wherein the page comprises a physical memory page of the first application, and wherein the page is shared with the second application.

13. The method of claim 1, wherein the page comprises a memory area in a shared library.

14. The method of claim 1, wherein the dropping of the write access message is to cause the remote application or the remote network interface to perceive the dropped write access message as a packet drop rather than a behavior of a non-standard-compliant network interface.

15. A method for Remote Direct Access Memory (RDMA) copy-on-write, the method comprising:
marking a page of a first application as copy-on-write when the first application and a second application share the page, and exposing the page via RDMA protocol to a remote application;
in response to a write access message to the page from the remote application, dropping the write access message; and
stalling the first application while a copy-on-write processing is pending, in response to the write access message to the page from the remote application,
wherein dropping the write access message is perceived by the remote application or a remote RDMA interface as a possible packet drop in a network switching fabric instead of a behavior of a non-standards-compliant RDMA interface.

16. The method of claim 15, wherein the page is no longer exposed via the RDMA protocol and is owned by the second application after performing the copy-on-write processing.

17. A first computing node configured to perform Remote Direct Access Memory (RDMA) operations, the first computing node comprising:
a first application;
a second application;
an operating system configured to mark a page of the first application as copy-on-write when the first application and the second application share the page; and
an RDMA interface configured to expose the page via RDMA protocol to a remote application running on a second computing node, and to drop a write access message to the page from the remote application received over a network between the first and second computing nodes, wherein dropping of the write access message is to cause the remote application or a remote RDMA interface at the second computing node to perceive the dropped write access message as a packet drop in the network; and
wherein the operating system is configured to stall the first application while a copy-on-write processing is pending, in response to the write access message to the page from the remote application.

18. The first computing node of claim 17, wherein the operating system is configured to further, in response to receipt of a subsequent write access message to the page from the remote RDMA interface, permit a write access to a copy of the page, wherein the operating system is to create the copy during the copy-on-write processing.

19. The first computing node of claim 18, wherein the write access to the copy is performed by the remote RDMA interface without requiring the remote RDMA interface to change the address targeted by the subsequent write access message.

20. The first computing node of claim 18, wherein the operating system is configured to remove the first application from a stalled state after the copy is created.

21. The first computing node of claim 17, wherein the page is no longer exposed via the RDMA protocol and is owned by the second application after performing the copy-on-write processing.

22. The apparatus of claim 17, wherein the RDMA interface is configured to send an interrupt to the operating system after dropping the message.

23. The apparatus of claim 17, wherein the RDMA interface is configured to set an invalid value in a translation table when there is an incoming write access message.

24. The apparatus of claim 23, wherein the RDMA interface is configured to clear the invalid value after a copy of the page is created by the copy-on-write processing.

25. The first computing node of claim 17, wherein the operating system is configured to set an invalid value in a system page table pointing to the first application.

26. The first computing node of claim 25, wherein the operating system is configured to set the invalid value after the write access message is received from the remote application.

27. The first computing node of claim 25, wherein the operating system is configured to clear the invalid value in the system page table after a copy of the page is created in response to the write access message to the page from the remote application so that the first application is able to access the copy.

28. The first computing node of claim 17, wherein the page comprises a physical memory page of the first application, and wherein the page is shared with the second application.

29. The first computing node of claim 17, wherein the page comprises a memory area in a shared library.

30. The first computing node of claim 17, wherein the dropping of the write access message is to cause the remote application or the remote RDMA interface to perceive the dropped write access message as a packet drop rather than a behavior of a non-standard-compliant RDMA interface.

31. An apparatus for Remote Direct Access Memory (RDMA) copy-on-write, the apparatus comprising:
a first application;
a second application;
an operating system configured to mark a page of the first application as copy-on-write when the first application and the second application share the page; and
an RDMA interface configured to expose the page via RDMA protocol to a remote application, and to drop a write access message to the page from the remote application; and
wherein the operating system is configured to stall the first application while a copy-on-write processing is pending, in response to the write access message to the page from the remote application,
wherein the dropping of the write access message is perceived by the remote application or a remote RDMA interface as a possible packet drop in a network switching fabric instead of a behavior of a non-standards-compliant RDMA interface.

32. A first computing node configured to perform Remote Direct Access Memory (RDMA) operations, the first computing node comprising:
means for marking a page of a first application as copy-on-write when the first application and a second application in the first computing node share the page, and exposing the page via RDMA protocol to a remote application in a second computing node;
means for dropping a write access message to the page from the remote application received over a network between the first and second computing nodes to cause the remote application or a remote network interface at the second computing node to perceive the dropped write access message as a packet drop in the network; and
means for stalling the first application while a copy-on-write processing is pending, in response to the write access message to the page from the remote application.

33. The first computing node of claim 32, further comprising:
   means for permitting a write access to a copy of the page, wherein the copy is created during the copy-on-write processing.

34. An article of manufacture, comprising:
   a machine-readable medium having stored thereon instructions that upon execution by a first computing node causes the first computing node to:
   mark a page of a first application as copy-on-write when the first application and a second application in the first computing node share the page, and expose the page via RDMA protocol to a remote application at a second computing node;
   in response to a write access message to the page from the remote application, drop the write access message received over a network between the first and second computing nodes to cause the remote application or a remote network interface at the second computing node to perceive the dropped write access message as a packet drop in the network; and
   stall the first application while a copy-on-write processing is pending, in response to the write access message to the page from the remote application.

35. The article of manufacture of claim 34, wherein the instructions permit a write access to a copy of the page, wherein the copy is created during the copy-on-write processing.

36. The article of manufacture of claim 34, wherein the dropping of the write access message is to cause the remote application or the remote network interface to perceive the dropped write access message as a packet drop rather than a behavior of a non-standard-compliant network interface.

* * * * *